Oct. 10, 1967  H. A. THOMPSON  3,346,508
METHOD FOR EMULSION BREAKING OF CRUDE OILS
Original Filed June 29, 1961
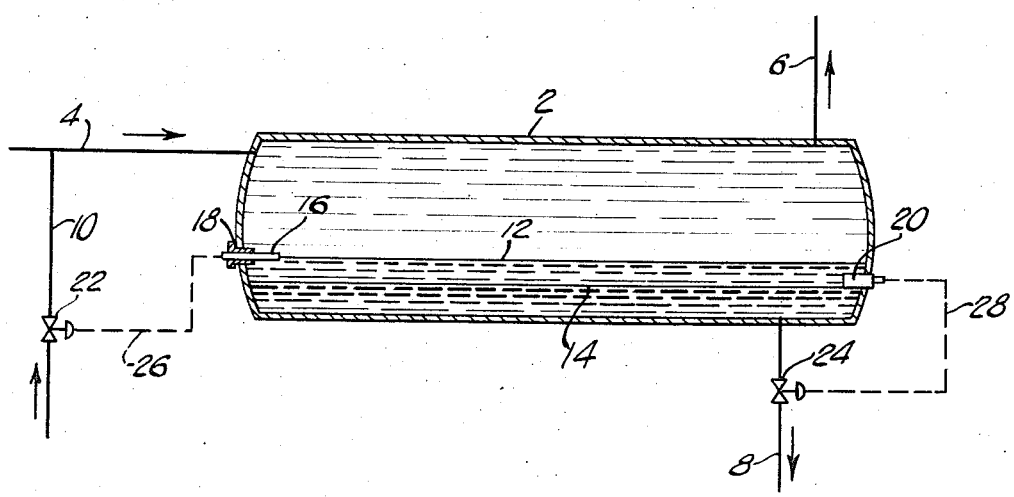

3,346,508
METHOD FOR EMULSION BREAKING OF CRUDE OILS
Harold A. Thompson, Lockport, Ill., assignor to Texaco Inc., New York, N.Y., a corporation of Delaware
Original application June 29, 1961, Ser. No. 120,544, now Patent No. 3,220,930. Divided and this application Aug. 16, 1965, Ser. No. 489,092
1 Claim. (Cl. 252—328)

ABSTRACT OF THE DISCLOSURE

A method for de-emulsifying an aqueous crude oil into an oil phase, a water phase and an oil-water emulsion phase intermediate the oil and water phases, wherein the intermediate phase is maintained at a predetermined depth by controlling the introduction of the de-emulsifying agent and the amount of water withdrawal at rates responsive to the positions of the upper and lower interfaces of the intermediate phase respectively.

---

This application is a division of application Ser. No. 120,544, filed June 29, 1961, now Patent No. 3,220,930.

This invention relates to a method for de-emulsification of an aqueous oil emulsion. In one of its more specific aspects, this invention relates to control means in apparatus for emulsion breaking of crude oils for regulating the depth of an immiscible emulsion phase upon resolving of the emulsion.

Crude oil obtained from the oil well usually contains water, often in substantial quantities, and the oil may be drawn from the well as an emulsion of oil and water. Also, raw crude oil may be washed with water to remove inorganic salts from the oil, or the oil may be treated with aqueous alkaline solutions to neutralize the acidity of the oil, thereby forming an aqueous crude oil emulsion. However, water present in crude oils is especially detrimental to equipment employed in the many refinery processes, such as cracking or distillation, or may create hazardous conditions during processing, and therefore must be removed or separated from the oil.

Aqueous crude oil emulsions may be resolved by placing the emulsion in a settling tank or vessel of relatively large cross-section wherein the oil and water separate therefrom as immiscible liquids which are withdrawn separately from the tank. In order to facilitate separation, a chemical agent capable of breaking the emulsion may be employed. In still another procedure in resolving aqueous crude oil emulsions, a high-potential electric field is applied whereby adjacent water droplets coalesce until large drops form and settle out by gravity. It is often desirable to employ a chemical breaking agent in combination with an electrical resolution means, such as a conventional electric dehydrator unit which is a standard item on the market. Because the resulting liquid phases are immiscible, the oil phase, having thte lower specific gravity or density, rises to the top of the tank whereas the water being of higher density gravitates towards the bottom of the tank. As a consequence, separation of the two liquids after de-emulsification is generally readily accomplished.

The proper quantity of chemical de-emulsifying agent employed in an emulsion breaking process is dependent primarily upon the type of chemical agent used and the nature of the aqueous crude oil emulsion undergoing treatment, and may be determined by experiment. When the breaking agent is employed in sufficiently large quantities, the emulsion is resolved rapidly, and two liquid phases only are present in the tank. However, it is economical to operate with a minimum amount, or dosage, of breaking agent. In practice, therefore, the desired minimum amount is determined by starting the process with a large or excessive dosage of breaking agent to break the aqueous crude oil emulsion rapidly. The amount of breaking agent used is decreased gradually without any corresponding decrease in residence time given the emulsion in the tank. As a result, the emulsion is resolved more slowly, and as the amount of breaking agent added to the emulsion is reduced, a point is reached at which the interface between the oil phase and the water phase in the tank is no longer distinct. An oil-water emulsion phase develops in the tank intermediate the overlying oil phase and the underlying water phase, and is immiscible therewith. The depth of this intermediate oil-water emulsion phase can be relatively shallow as compared to the depth of the oil phase or the water phase.

Optimum results may be achieved by operating with an oil-water phase at a predetermined depth which is dependent upon the characteristics of the crude oil, the type of chemical breaking agent used, and the capacity of the settling tank. For example, in treating aqueous crude oils using a settling tank having a capacity of 550 to 800 barrels, it has been found desirable to maintain this intermediate oil-water emulsion phase in the tank at a depth of about 12 to 14 inches. However, constant attention is required to maintain optimum conditions employing a minimum quantity of chemical breaking agent, and therefore customary practice is to add additional breaking agent to the aqueous crude oil emulsion introduced into the settling tank. This results in a waste of expensive chemicals.

This invention has therefore as a primary object to provide a method for de-emulsification of an aqueous oil emulsion. A further object is to provide a system for controlling the oil-water emulsion phase present in the settling tank to a predetermined depth whereby a desired or regulated quantity of chemical breaking agent is employed in the emulsion breaking treatment. As a further object of this invention, there is provided in an apparatus of the above type, a control system operated by automatic means and under economical conditons.

In general, the apparatus of this invention comprises a settling vessel usually of a cylindrical or spherical structure whereby the aqueous crude oil undergoing de-emulsification is introduced into the vessel to permit separation of oil therefrom. As explained above, this results in the formation of immiscible liquids of different densities thereby providing an interface therebetween, and includes an oil-water layer intermediate an overlying oil phase and an underlying water phase. In addition, the liquid phase exhibits different electrical properties, this difference being particularly distinct between the oil phase and the oil-well emulsion phase. An inlet is provided for introducing the aqueous crude oil emulsion into the vessel, the inlet generally being provided near or at one side of the vessel and desirably near the top. A conduit having a valve means interposed therein is provided for adding a chemical de-emulsifying agent to the aqueous crude oil emulsion. The chemical agent is preferably added prior to introducing the emulsion into the vessel to afford sufficient opportunity for the chemical agent to intimately admix with the emulsion. The settling vessel is provided with a first outlet for withdrawing oil substantially free of water from the vessel, this outlet desirably being oppositely disposed to the aforesaid inlet. Similarly, the water is withdrawn from the vessel via a second outlet having a valve means interposed therein. Because of the difference in density between liquids in the vessel, the outlet for withdrawing the crude oil is located at or near the top of the vessel and the outlet for withdrawing the water is positioned at or near the bottom of the vessel. The vessel is provided with probe means in operative communication with each the said valve means for detecting the level of the interface between the oil and the oil-water emulsion, and for detecting the level of the interface between the oil-water emulsion and the water. The probe means thus detects any shift in the levels of the interfaces between the liquid phases which in turn actuate the valve means, thereby regulating the rate of addition of de-emulsifying agent and/or the rate of withdrawal of water. By reason of this control, the oil-water emulsion phase in the vessel is controlled at a predetermined depth, and the chemical breaking agent is employed in a regulated quantity.

In order to describe the invention in greater detail, reference is now made to the accompanying drawing which schematically illustrates one embodiment of the apparatus of my invention. Aqueous crude oil emulsion is introduced to the settling vessel 2 via line 4 from a source not shown. Vessel 2 may be of any desired capacity, for example 800 barrels. The crude oil containing water is introduced to the vessel to permit separation of the oil therefrom as explained above. The resulting oil being substantially free from water is withdrawn from the top of the tank via conduit 6 which is oppositely disposed to inlet line 4. The water rendered upon breaking of the emulsion settles to the bottom, and is withdrawn from the vessel through line 8 at the bottom of the vessel, and oppositely disposed to inlet line 4. It should be understood that the water may have various inorganic salts dissolved therein as well as other constituents which may have been present in the raw petroleum coming from the oil well or may have been introduced to the oil in some prior treatment.

As previously explained, a suitable de-emulsifying chemical agent, for example, Tretolite desalting chemical agent, Nalco 538, sodium hydroxide, sodium silicate or mixtures thereof, is introduced to the aqueous crude oil emulsion undergoing separation treatment to facilitate rendering of the emulsion. The de-emulsifying agent is more effective when intimately admixed with the aqueous crude oil emulsion, and therefore the breaking agent is desirably admixed with the emulsion prior to entering in the settling vessel. As illustrated, the de-emulsifying agent is added to the emulsion passing through line 4 via conduit 10 which empties into line 4. The chemical agent may be fed through conduit 10 from any suitable source (not shown) such as a motor operated feeder.

In accordance with a specific embodiment of the present invention, means is provided for automatically maintaining the oil-water emulsion layer at a predetermined depth in the settling vessel 2, which, as shown in the drawing, is defined by the two parallel lines 12 and 14. Line 12 indicates the interface between the oil layer and the oil-water emulsion layer, and line 14 indicates the interface between the oil-water emulsion layer and the underlying water layer.

In a preferred specific embodiment of this invention, I provide an electrical probe 16 having a bushing 18 which extends into the vessel to determine the position of the uppermost level of the emulsion layer which defines the interface between the oil-water emulsion layer and the oil layer. The electrical probe is particularly desirable because of the sharp difference in electrical properties between the oil and the oil-water emulsion. There is a difference in specific gravities between the oil-water emulsion layer and the water layer, and therefore density probe 20 may be employed for detecting the position of the interface between these liquid phases. Density probe 20 extends into the vessel to determine the position of the lowermost level of the oil-water emulsion layer which defines the interface between the emulsion and the water. Valve means 22 interposed in conduit 10 regulates the quantity of chemical breaking agent introduced to the aqueous crude oil emulsion. Outlet 8 is provided with valve means 24 for controlling the withdrawal of water from the settling vessel 2. Both valve means 22 and 24 are in operative communication with the probe 16 and 20, respectively, such that when the level of the interface changes, the valve means are actuated to a more opened or more closed position. In order to control the depth of the emulsion layer automatically, a suitable communication is provided between electrical probe 16 and valve 22, and similarly between density probe 20 and valve 24, as indicated by the broken lines 26 and 28. Thus, for example, a solenoid winding (not shown) may be provided at each of valves 22 and 24 with suitable electrical circuits, such that when current flows therethrough, the solenoid is energized and the valve actuated to an open position.

In operation of a specific embodiment of apparatus of this invention aqueous crude oil emulsion undergoing treatment is introduced to settling vessel 2. A suitable de-emulsifying chemical agent is admixed with the emulsion to facilitate the breaking operation. It is understood that when a larger or excessive quantity of de-emulsifying agent is employed, the emulsion is more rapidly broken. Under such conditions, the emulsion entering vessel 2 rapidly separates into an oil phase and a water phase resulting in 2 immiscible layers. As the quantity of de-emulsifying agent is reduced, there is a corresponding decrease in rate of breaking of the emulsion. As a consequence, the interface between the oil and water in the settling vessel becomes less distinct, and an oil-water emulsion phase or layer forms, as explained above, this layer being intermediate the overlying oil layer and the underlying water layer. As the uppermost level of the oil-water emulsion layer in the vessel rises, electrical probe 16 contacts the oil-water emulsion and current flows from the electrical connection thereby energizing a suitable solenoid to actuate valve 22 to permit introduction of additional chemical breaking agent to the aqueous crude oil emulsion such that the emulsion may be more rapidly broken thereby preventing any further build-up of the oil-water emulsion layer in the settling vessel. In the event the aqueous crude oil emulsion is broken so rapidly that the uppermost level of the emulsion layer drops to a level below electrical probe 16, no electric current flows whereby the solenoid which actuates valve 22 is de-energized and the valve is shifted towards the closed position to reduce rate of chemical addition. This prevents introduction of additional breaking agent to the aqueous crude oil emulsion whereby the depth of the emulsion layer may again rise to the predetermined level as determined by broken line 12. The lowermost level of the oil-water emulsion layer in the settling vessel 2 as defined by broken line 14 is controlled by density probe 20. During operation any change in the interface between the oil-water emulsion layer and the water layer is detected by density probe 20. The density probe may be provided with a suitable switch means (not shown) to control the supply of electrical energy to valve 24. Thus, when the level of line 14 rises the switch is actuated by the density probe to close the circuit thereby energizing a suitable solenoid (not shown) which actuates valve 24 to a more open position to permit more water to drain from the vessel. The interface between the oil-water emulsion layer and the water layer is maintained at a substantially constant level. It will be observed that by reason of the control means of this invention, the intermediate oil-water emulsion layer in the settling vessel is controlled at a predetermined depth, and thereby the quantity of the de-emulsifying agent employed in breaking of the aqueous crude oil emulsion is closely regulated.

It should be understood that economical de-emulsifying chemical agents are available and in common use, and forms no part of this invention. The type of chemical agent employed in breaking aqueous crude oil emulsions, and the quantity employed in the operation, is dependent to a large extent upon the composition of the crude oil and on such conditions as temperatures and pressures maintained in the system. Although the invention has been described in detail in connection with employing a chemical agent in resolving the aqueous crude oil emulsion, it should be understood that other means may be used in combination with the chemical breaking agent. Thus, the oil may be introduced to an electric dehydrator and an electric field applied to resolve the emulsion. To facilitate resolution of the emulsion, a chemical agent is added, and, by reason of my invention, a regulated quantity of chemical agent is employed in the de-emulsification treatment.

Having described my invention and a preferred embodiment thereof, I claim:

A method for de-emulsification of an aqueous crude oil emulsion by separation into immiscible liquids of different electrical properties and different densities including an oil phase, a water phase, and an oil-water emulsion phase intermediate said oil phase and said water phase with interfaces between each of the phases which comprises introducing said aqueous crude oil emulsion into a vessel wherein said separation occurs into said immiscible liquids, introducing a de-emulsifying agent into said aqueous crude oil emulsion through valve means operatively actuated by an electrical probe responsive to the position of the interface between said oil phase and said oil-water emulsion phase in said vessel for regulating the introduction of said de-emulsifying agent into said aqueous crude oil emulsion, withdrawing oil substantially free of water from the upper part of said vessel, withdrawing water from the lower part of said vessel through outlet valve means operatively actuated by a density probe responsive to the position of the interface between said water phase and said oil-water emulsion phase in said vessel for regulating the rate of withdrawal of said water phase, whereby a predetermined oil-water emulsion phase in said vessel is controlled by the interface responses of said probes.

References Cited
UNITED STATES PATENTS

| | | | |
|---|---|---|---|
| 2,023,545 | 12/1935 | Pummill | 196—46 |
| 2,524,933 | 10/1950 | Silverman | 73—304 X |
| 2,852,349 | 9/1958 | Hicks et al. | 196—46 X |
| 2,953,501 | 9/1960 | Mignone | 196—46 X |
| 3,163,173 | 12/1964 | Kuntz | 252—328 X |

LEON D. ROSDOL, *Primary Examiner.*

H. B. GUYNN, *Assistant Examiner.*